United States Patent Office 3,126,760
Patented Mar. 31, 1964

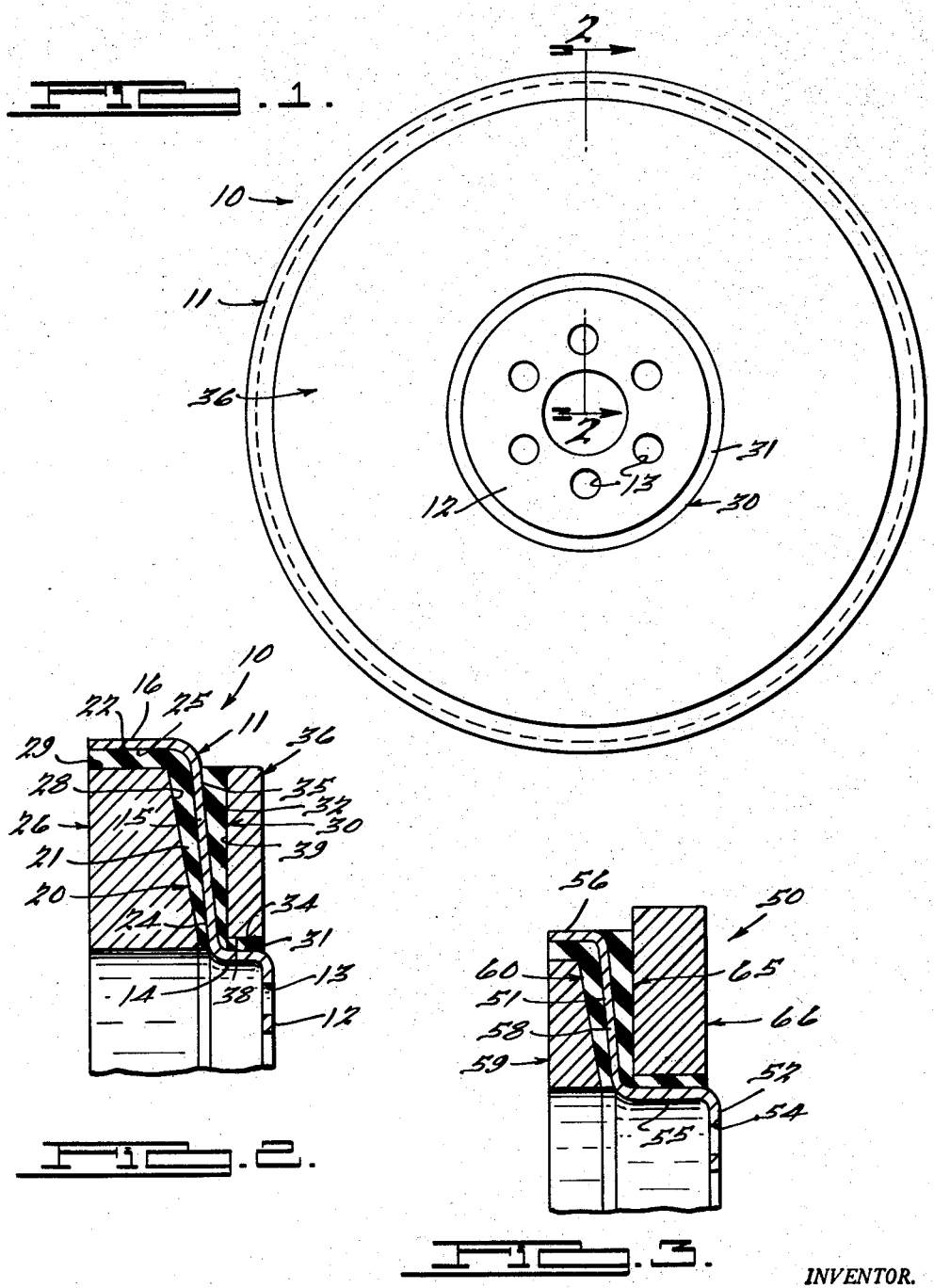

3,126,760
DYNAMIC DAMPER
Thomas H. Peirce, 16725 Shaftsbury, Detroit, Mich.
Filed Aug. 17, 1959, Ser. No. 834,311
2 Claims. (Cl. 74—574)

This invention relates generally to dynamic torsional vibration dampers, and more particularly to a two-mass torsional vibration damper for dampening vibrations occuring at a first and second fundamental natural frequency of torsional vibration of a shaft.

Rotatable shafts, for example the crankshafts of conventional multicylinder internal combustion engines, are often caused to vibrate torsionally because of cyclic forces to which they are subjected during rotation. It is well known to dampen such torsional vibrations, occurring at a first relatively low natural frequency, by the use of a tuned dynamic torsional vibration damper. Such torsional vibration dampers generally comprise a mass resiliently secured to and adapted to rotate concentrically with the shaft. The value of the mass, in conjunction with the resiliency of its connection to the shaft, is so determined that the damper vibrates at a frequency tuned to the first fundamental natural frequency or mode of vibration of the shaft in opposition to the torsional vibration of the shaft. Dynamic torsional vibration dampers of this type are effective to dampen vibrations occurring at the particular natural fundamental frequency to which they are tuned, irrespective of the nature of the external exciting forces.

However, as more fully discussed in my Patent No. 2,477,081 issued July 26, 1949 entiled, "Means for Dampening Torsional Vibrations in Internal Combustion Engines," shafts, and particularly the crankshafts of multicylinder internal combustion engines, have a plurality of fundamental natural frequencies or modes of torsional vibration with the higher frequency vibrations becoming of major consequence when they come into the operating range of the engine. Because modern internal combustion engines are often designed to operate at high enough speeds to be near the second mode, dampening of these higher frequency torsional vibrations, as well as the lower frequency vibrations, is of increasing importance.

Accordingly, one object of the present invention is to provide an improved means for dampening torsional vibration occurring at a fundamental natural frequency of vibration of a shaft.

Another object of the present invention is to provide an improved two-mass dynamic torsional vibration damper, adapted to dampen vibrations occurring at a first and second natural frequency of vibration of a shaft.

A still further object of the present invention is to provide a pair of dynamic torsional vibration dampers mounted on a single support retainer and adapted to dampen torsional vibrations at a first and second natural frequency of a shaft.

Another object is to provide a two-mass dynamic torsional vibration damper having a minimum cross-sectional area.

Other objects and advantages of the present invention will become apparent from the following description wherein reference is made to the drawings, in which:

FIGURE 1 is a front elevation of a dynamic torsional vibration damper in accordance with an exemplary embodiment of the present invention;

FIG. 2 is a cross-sectional view taken substantially along the line 2—2 of FIG. 1; and FIG. 3 is a cross-sectional view, similar to FIG. 2, of a modified torsional vibration damper.

A dynamic torsional vibration damper 10, in accordance with an exemplary embodiment of the present invention illustrated in FIGS. 1 and 2, comprises a support or retainer 11, preferably a steel stamping, having a stepped, cup-shaped cross-sectional configuration which appears to be substantial Z-shaped in fragmentary cross section. The retainer 11 has a central coupling portion 12 having a plurality of spaced holes 13 to facilitate attachment of the damper 10 to a shaft (not shown). The retainer 11 has an axially extending inner flange 14, a radially outwardly extending plate 15 and an axially extending outer flange 16. The inner and outer flanges 14 and 16, respectively, in conjunction with the coupling portion 13 and plate 15, define the stepped, cup-shaped cross-sectional configuration of the retainer 11.

An inner resilient membrane 20, preferably of rubber or any other equivalent material subject to hysteresis losses and having suitable physical properties, having a radially extending portion 21 and an axially extending portion 22 is bonded to the retainer 11, as by cementing. The radially extending portion 21 of the resilient membrane 20 is bonded to an inner face 24 of the plate 15 and the axially extending portion 22 is bonded to an inner peripheral surface 25 of the flange 16. The axial thickness of the radially extending portion 21 of the membrane 20 progressively increases radially outwardly of the damper 10 for a reason to be discussed hereinafter.

A low frequency mass 26 comprising an annular ring of relatively heavy material, for example steel, is bonded to the resilient membrane 20 as by cementing. The mass 26 has a transverse end face 28 and an outer peripheral surface 29 bonded to the radially outwardly extending portion 21 and axially extending portion 22, respectively, of the resilient membrane 20. The low frequency mass 26, in conjunction with the resiliency of the membrane 20 is tuned to vibrate torsionally with respect to the retainer 11 at a first natural frequency of vibration of a shaft (not shown) in opposition to torsional vibrations within the shaft.

An outer resilient membrane 30 is bonded to the retainer 11 as by cementing. The resilient membrane 30 has an axially extending portion 31 and a radially outwardly extending portion 32 bonded to an outer peripheral surface 34 of the flange 14 and an outer face 35 of the plate 15, respectively. The radially outwardly extending portion 32 of the membrane 30 increases in axial thickness radially outwardly of the damper 10 for a reason to be discussed.

A relatively small high frequency mass 36 in the form of an annular ring of relatively heavy material, for example steel, is bonded to the resilient membrane 30, as by cementing. The mass 36 has an inner peripheral surface 38 and a radially outward extending end face 39 bonded to the portions 31 and 32, respectively, of the membrane 30. The mass 36 is tuned to vibrate torsionally with respect to the retainer 11 at a second natural frequency of vibration of a shaft (not shown) and in opposition thereto.

Because the transverse portions 21 and 32 of the membranes 20 and 30, respectively, increase in axial thickness radially outwardly, the material thereof, for example rubber, is subjected to uniform unit stress upon torsional deflection of the masses 26 and 36 with respect to the retainer 11, thereby eliminating localized wear of the resilient membranes 20 and 30. The plate 15 of the retainer 11 is disposed at an angle with respect to the central axis of the damper 10 so as to accommodate the increased axial thicknesses of the transverse portions 21 and 32 of the membranes 20 and 30, respectively, thereby maintaining, in cooperation with the angular disposition of the end face 28 on the mass 26, a generally rectangular cross section of minimum area for the damper 10.

Referring to FIG. 3, a dynamic damper 50, essentially similar to the dynamic damper 10 discussed hereinbefore, comprises a support or retainer 51 having a coupling portion 52 with a plurality of holes 54 therein to facilitate attachment of the damper 50 to a shaft (not shown). The retainer 51 is of stepped, cup-shaped cross-sectional configuration defined by inner and outer axially extending flanges 55 and 56, respectively, having a radial plate 58 therebetween.

A resilient membrane 60, preferably of rubber, is bonded to the plate 58 and outer flange 56, respectively, as by cementing. A relatively small high frequency mass 59 in the form of an annular ring of, for example, steel, is bonded to the resilient membrane 60 as by cementing.

An outer resilient membrane 65 is bonded to the inner flange 55 and plate 58 of the retainer 51, as by cementing. An annular relatively heavy, low frequency mass 66 is bonded to the membrane 65, as by cementing. The plate 58 of the retainer 51 is disposed at an angle with respect to the central axis of the damper 50 so as to accommodate the varying axial thickness of the membranes 60 and 65, thereby to define the generally rectangular cross-sectional configuration of the damper 50.

From the above description it should be apparent that the present invention discloses an improved two-mass torsional vibration damper mounted on a single retainer, and because of its relatively compact construction, requiring a minimum of mounting space.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A dynamic damper for dampening torsional vibrations of a shaft occurring at a first and second natural frequency of torsional vibration of the shaft comprising a one-piece retainer having first and second axially and radially spaced axially extending flanges thereon and a radially extending plate therebetween, a first resilient membrane bonded to the inner peripheral surface of said first flange and to one side of said plate, an annular mass bonded to said first resilient member, a second resilient membrane bonded to the outer peripheral surface of said second flange and to the other side of said plate, a second annular mass bonded to said second resilient membrane, and means for securing said damper to a shaft for rotation concentrically therewith.

2. A dynamic damper for dampening torsional vibrations occurring at a first and second natural frequency of torsional vibration of a shaft comprising a one-piece circular retainer having a pair of concentric axially and radially spaced axially extending flanges with a radially extending plate therebetween, a resilient membrane bonded to the inner peripheral surface of one of said flanges and to one side of said plate, the portion of said resilient membrane bonded to said plate increasing in axial thickness radially outwardly of said plate, a first mass bonded to said resilient membrane, a second resilient membrane bonded to the outer peripheral surface of the other of said flanges and to the other side of said plate, the portion of said second resilient membrane bonded to the other side of said plate increasing in axial thickness radially outwardly of said plate, a second mass bonded to said second resilient membrane, and means on said retainer for securing said damper to said shaft for rotation therewith.

References Cited in the file of this patent

UNITED STATES PATENTS

| | | |
|---|---|---|
| 1,967,446 | Meyer | July 24, 1934 |
| 2,041,507 | Zeder | May 19, 1936 |
| 2,049,133 | Peirce | July 28, 1936 |
| 2,062,369 | Meyer | Dec. 1, 1936 |
| 2,477,081 | Peirce | July 26, 1949 |
| 2,594,555 | Hardy | Apr. 29, 1952 |
| 2,861,472 | Hansz | Nov. 25, 1958 |

FOREIGN PATENTS

| | | |
|---|---|---|
| 876,921 | France | Aug. 24, 1942 |